Figure 1:
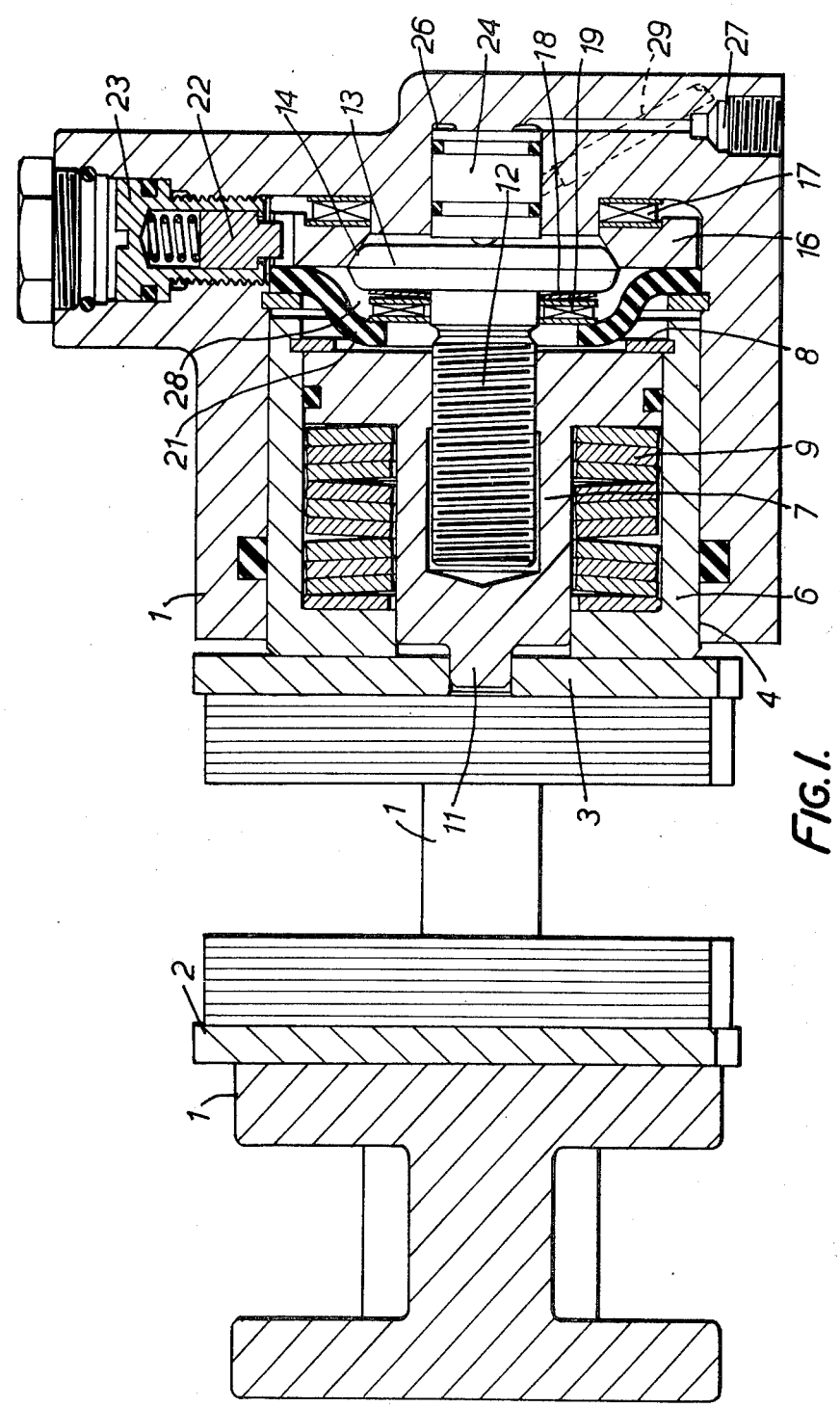

United States Patent [19]
Wright

[11] 3,983,975
[45] Oct. 5, 1976

[54] LOCK ASSEMBLY FOR A VEHICLE DISC BRAKE

[75] Inventor: Andrew Charles Walden Wright, Birmingham, England

[73] Assignee: Girling Limited, Birmingham, England

[22] Filed: Apr. 25, 1975

[21] Appl. No.: 571,550

[30] Foreign Application Priority Data
May 8, 1974   United Kingdom............... 20369/74

[52] U.S. Cl.................................. 188/265; 92/17; 188/71.9; 188/196 D; 303/89
[51] Int. Cl.²......................................... F16D 63/00
[58] Field of Search................ 188/71.9, 72.3, 72.4, 188/106 P, 196 D, 265, 353; 303/89; 92/17

[56] References Cited
UNITED STATES PATENTS

| | | | |
|---|---|---|---|
| 3,472,124 | 10/1969 | Roselius et al...................... | 188/265 |
| 3,653,473 | 4/1972 | Clay et al............................ | 188/353 |
| 3,767,016 | 10/1973 | Hust.................................... | 188/196 D |
| 3,770,084 | 11/1973 | Hill...................................... | 188/265 |
| 3,809,189 | 5/1974 | Farr................................. | 188/196 D |
| 3,885,653 | 5/1975 | Farr................................. | 188/196 D |

Primary Examiner—George E. A. Halvosa
Assistant Examiner—Edward R. Kazenske
Attorney, Agent, or Firm—Scrivener Parker Scrivener and Clarke

[57] ABSTRACT

A disc or drum brake fluid pressure actuator incorporates a lock actuator strut acting on an inner part of a telescopic piston assembly, of which the inner and outer parts are normally rendered effectively unitary by pre-stressed spring which can, however, deflect under excess pressure to permit extension of the lock actuator strut when it is desired to operate the strut for parking purposes. An hydraulic control system for operating the actuator is also described and illustrated.

5 Claims, 2 Drawing Figures

LOCK ASSEMBLY FOR A VEHICLE DISC BRAKE

This invention relates to actuators for fluid pressure actuated vehicle wheel brakes, and includes drum brake actuators and disc brake actuators.

More particularly, the invention relates to brake actuators comprising a cylinder having a brake applying piston exposed at its inner end to a pressure space within the cylinder and a lock actuator strut within the cylinder and operable to hold the piston in an extended condition to maintain the brake applied for parking.

One arrangement of this general form is disclosed in British Patent Specification No. 1,288,774. A disadvantage of the arrangements described and illustrated in that specification is that the seals between the pistons and the cylinder bore can be caused to travel excessively under high pressures if, for example, the pressure applied is sufficient to overcome the pre-stress in the spring means interposed between one piston and its associated thrust tappet.

It is well understood in the art that overtravel of piston seals at high pressures leads to early destruction of the seals.

The present invention provides a brake actuator in which this difficulty is avoided, by virtue of the fact that the (or each) piston comprises an annular outer part slidably sealed in the cylinder bore and an inner part telescopically and sealingly received in the outer part, with a pre-stressed spring device acting between the piston parts to transmit braking and reaction forces, and the lock actuator strut acts on the inner piston part.

With this arrangement, it is possible to ensure that the seal between the outer piston part and the cylinder only experiences the relative travel necessary to apply the brake, and that any additional travel required to allow for deflection of the pre-stressed spring device is experienced only by the seal between the piston parts.

Preferably operation of the lock actuator strut is controlled by an auxiliary fluid pressure motor comprising a motor piston having one end exposed to pressure in an auxiliary cylinder space and its opposite end exposed to pressure in the said pressure space. Thus, the auxiliary piston may be neutralized by the application to both ends of equal pressures and rendered effective by the application of a greater pressure to the auxiliary cylinder space than in the main working space.

The lock actuator strut may comprise a screw threaded shank co-operating with a nut constituted by the inner piston part, the arrangement being such that a predetermined minimum movement of the piston in the brake applying direction frees the shank for rotation, whereas a shorter return movement causes it to lock, whereby the lock actuator strut also acts as an automatic wear adjuster for the brake applying piston.

In normal service brake operation of the brake, the inner piston part moves as one with the outer part and any necessary extension of the strut to compensate for friction lining wear takes place during the brake applying stroke. When the lock is to be applied, a pressure higher than normal is applied causing deflection of the pre-stressed resilient means (and possibly some structural deflection) the total deflection being greater than the axial play between the strut parts, so that when the strut is locked and the service brake pressure is relieved, the piston is held applied by the resilient means reacting through the strut parts against the brake structure.

The invention also includes a power hydraulic system for use with such a brake construction, the system including an hydraulic pressure source service brake control means for admitting liquid at service braking pressure to the working space of the cylinder, and separate lock control means operable to control the supply of pressure to the said auxiliary piston and also to supply liquid at a higher pressure than the service brake pressure to the working space.

The invention is particularly suitable for use in disc brake actuators, and is described below mainly in that context but it will be understood by those skilled in the art that various features of the invention and the illustrated embodiment thereof will be applicable also to wheel cylinders for internal shoe drum brakes.

Figure 2:
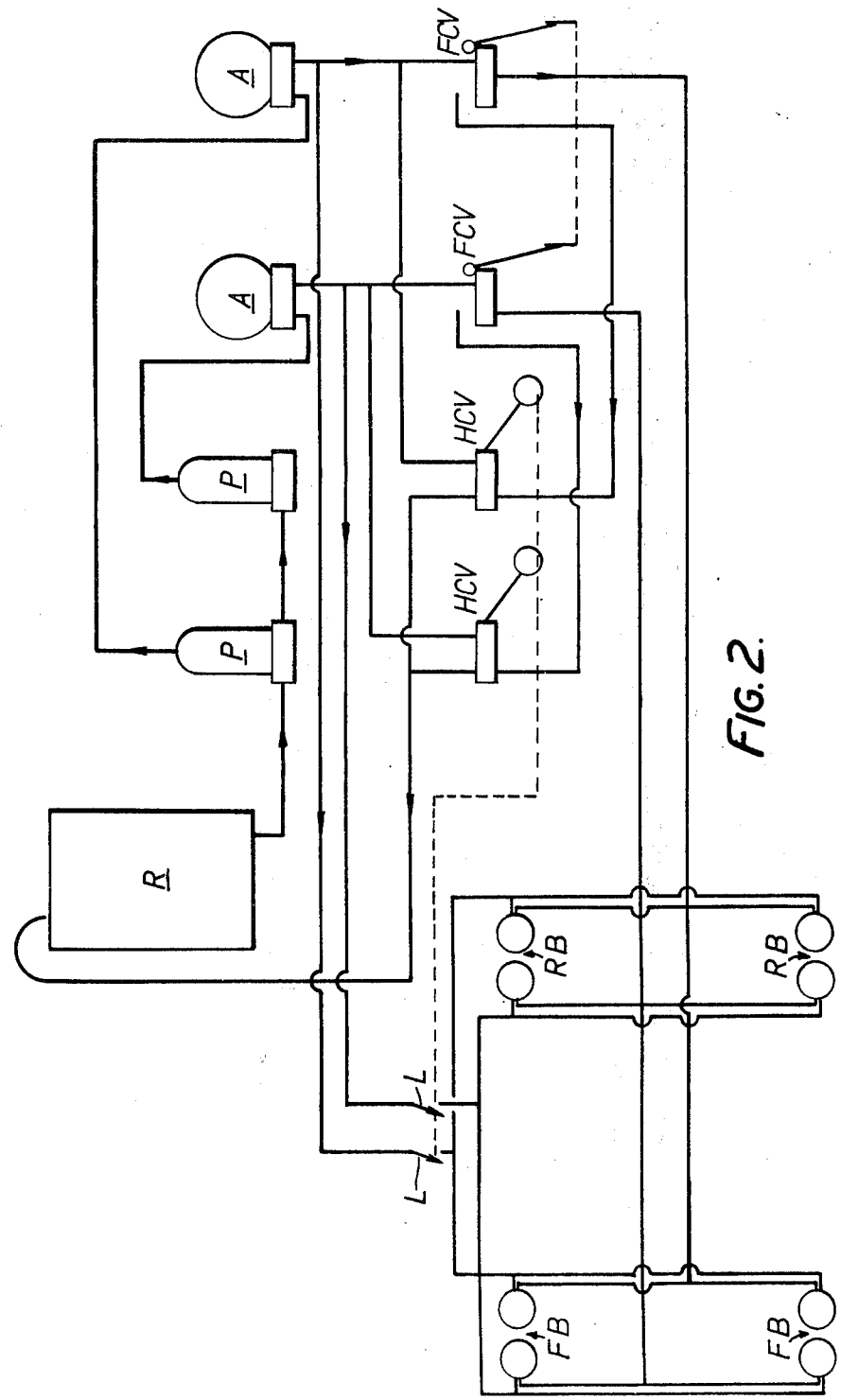

One form of disc brake and pressure system, both in accordance with the invention, will now be described, by way of example, with reference to the accompanying drawings, in which:

FIG. 1 is a sectional elevation of the disc brake; and
FIG. 2 is a circuit diagram of the pressure system.

The disc brake shown in FIG. 1 is of the single sided caliper type, comprising a caliper structure 1 carrying a reaction pad 2 and an applied pad 3. The caliper has a piston bore 4 for a piston 6 having an inner part 7 telescopically engaged therein and retained by a circlip 8 against the expanding action of a prestressed stack of belleville spring washers 9. At its outer (left-hand) end, the inner part 7 is keyed against rotation by its engagement at 11 with the backing plate of brake pad 3. The part 7 has an axial bore internally screw-threaded to receive the threaded shank of a male strut part 12. The screw threads between the parts 7 and 12 are of reversible (fast-helix) form, and the parts 7 and 12 together constitute an extensible strut assembly, as will be explained below.

The strut part 12 has a head 13 presenting a frustroconical clutch face 14 co-operating with a complementarily shaped clutch face formed in a disc-like clutch member 16 supported from the caliper structure by a thrust-bearing 17. The head 13 is normally pressed into frictional clutching engagement with the member 16 by a spring washer 18 acting against a thrust bearing 19 supported from the caliper structure by an annular retaining member 21. The clutch member 16 is formed on its outer periphery with gear teeth and is normally held stationary in the caliper structure by a spring-loaded plunger 22 engaged between a pair of gear teeth. The plunger 22 is mounted in a plug 23 which is removable to permit release and rotation of the clutch member 16, in the event of the lock becoming jammed, due for example to failure of the hydraulic clutch release means to be described below.

The clutch release means comprises an auxiliary piston 24 working in a cylinder bore 26 coaxial with the main piston bore 4 of the caliper structure. The cylinder bore is open at one end so that the piston 24 can bear, through a central domed projection, against the adjacent face of the head 13, while the other, closed, end of the bore is provided with a pressure inlet 27. A separate inlet, not shown, is provided for supplying fluid under pressure to the working space 28 of the piston bore 4, to act on the pistons 6 and 24. The piston 24 has two spaced circumferential seals and a leak passage 29 communicates with the space between the seals, so that failure of either seal will be indicated by liquid leaking through the passage 29 and appearing at the exterior of the caliper body.

In use, service braking pressure is supplied to the working space 28 at a pressure which, acting over the full diameter of inner part 7, is insufficient to cause deflection of the spring washers 9, which therefore act as a solid strut in transmitting pad-applying forces to the pad 3, the brake acting in this respect as a conventional hydraulic disc brake.

When the brake is actuated from a hydrostatic pressure system, the operation is as follows. In normal, service brake operation, no pressure is applied to the cylinder bore 26, so that the strut part 12 is resiliently biased into clutching engagement with clutch member 16. When service brake pressure is applied to the working space 28, the piston 6 and inner part 7 move in unison in the pad-applying direction, and the axial thread clearance between the parts 7 and 12 is taken up. This clearance is sufficient to provide normal pad-to-disc running clearance. The part 7 then tends to pull the part 12 off clutch member 16, and if there is some wear of the pads to be compensated, the strut part 12 will be rotated in a sense to extend the length of the strut. On brake pressure release, the part 12 will be re-engaged with the clutch member 16 to lock the part 12 against rotation and retraction of the piston 6 and inner part 7 will be checked when the thread clearances are taken up in the reverse direction.

If the parking lock is to be applied, a higher pressure is applied to the working space 28, causing compression of the spring washers 9 and possibly some structural deflection, the total deflection being in excess of the axial thread clearance between the strut parts 7 and 12, so that upon release of such pressure, the inner part is locked in a position in which the washers are held deflected, the spring force stored in the washers therefore applying an actuating or applying force to the piston 6, to hold the pads applied.

To release the parking lock, the same higher pressure is again applied to the working space 28 and a still higher pressure is supplied through inlet 27 to the closed end of bore 26, thus to the inner end of piston 26. The piston, which is subjected to a lower pressure at its opposite end, accordingly moves out of its bore to engage the head 13 of strut part 12 and thereby disengage it from clutch member 13. The pressure in working space 28 is then relieved, the pad return forces and force in spring washers 9 being transmitted through the reversible screw threads to strut part 12 which accordingly rotate, spinning on the domed projection of piston 24 to permit axial return movement of the inner part 7 to its illustrated position. The pressure in cylinder bore 24 is thus relieved to complete the cycle and return the brake to its normal, passive condition.

For operation with a power hydraulic pressure system; we prefer to supply during service brake actuation, a higher pressure to cylinder bore 24, so that the strut part 12 is free to spin, without waiting for the clutch clearances to be opened up. In this way, it is possible to work with smaller thread clearances and therefore to lock in higher braking efforts than in the hydrostatic mode described above. To lock the brake, a boosted pressure is applied to the working space 28 to deflect the spring washers 9, the pressure in cylinder bore 24 then being relieved to cause the clutch to engage and finally the pressure in the working space 28 is relieved.

The lock is released by applying the boosted pressure to space 28 and a higher pressure to cylinder bore 24. The boosted pressure is then relieved, and when the parts have returned to their normal position the pressure in bore 24 is relieved to allow re-engagement of the clutch.

A presently preferred form of power hydraulic system for operating in accordance with the last described mode is illustrated diagrammatically in FIG. 2.

The system comprises a liquid reservoir R supplying two pumps P in turn feeding pressure liquid accumulators A. The accumulators are connected to respective foot pedal controlled valves FCV connected to respective working spaces of front and rear wheel brake calipers FB and RB. The valves FCV are also connected to respective hand control valves HCV, the exhaust lines of which lead back to the reservoir R.

Second lines from the accumulators lead to the respective valves HCV and third lines to lock control valves L which may be integral with, or as indicated, linked with the hand control valves HCV. The downstream connection of the valves L are to the respective cylinder bores of the lock release or auxiliary pistons, corresponding to the bores 24 of FIG. 1.

In normal operation, service braking pressure is metered by the valves FCV to the working spaces of the wheel brakes, and through the closed valves L to the lock release cylinders of the brakes.

For a parking operation, the hand control valves HCV are operated (instead of the foot control valves) first to direct accumulator pressure through the foot control valves to the wheel brake working chambers, then to release pressure in the lock release cylinders and finally to relieve the pressure in the working spaces of the wheel brakes. It will be understood that the valves FCV apply a flow restriction which drops the pressure transmitted from the accumulators to a value between the full system pressure and the maximum pressure which is transmitted in service brake operation.

The system is shown as supplying four twin cylinder, single sided calipers, but this is obviously subject to variation to suit individual vehicle requirements.

For example, the construction is readily applicable with minimal modification, to a wheel brake cylinder of the single ended type having one piston working in a cylinder body closed at one end, or with further modification to a double ended cylinder body of the type having a single pressure space and opposed pistons at opposite ends of the pressure space. In such a case, the fixed clutch face 14 of the above described acutator would be formed on one piston or on a component normally fast with that piston but preferably releasable to permit rotation of the clutch face in the event of the lock actuator becoming jammed.

In each case, a relatively compact construction can be obtained, due mainly to the fact that the full diameter of the (or each) piston is available as an effective area, in contrast to the annular pistons found in British Patent Specification No. 1,288,774.

Although described above in detail with respect to disc brakes, features of the invention are also applicable to drum brakes.

It will be noted that the pre-stressed resilient means (the belleville washers 9) transmit normal braking loads without deflection. This is in contradistinction to some prior proposals in which mechanical deflection of standard brake components is employed to provide compliance for ensuring that the locking load is retained in the strut, and others in which pre-stressed means are designed to yield to provide against overloading of the strut due to contraction of other brake components during cooling.

I claim:

1. A brake actuator for a fluid pressure actuated vehicle wheel brake, comprising a cylinder defining a pressure space, a brake applying piston having an inner end exposed to said pressure space; and strut means disposed within said cylinder and co-operating with said piston, lock means cooperating with said strut means and being selectively operable to maintain said piston in an extended, brake applying position, wherein said piston comprises an annular outer piston part slidingly sealed in said cylinder; an inner piston part telescopically sealed in said outer piston part; and pre-stressed resilient means acting between said piston parts to resist telescoping thereof under normal braking and reaction load pressures, said inner piston part being operatively coupled to said strut means, and said resilient means being constructed to yield in response to a predetermined pressure greater than said normal pressure which after moving said outer piston part to an extended brake applying position causes said inner piston part to telescope within said outer piston part and operate said lock means to lock said strut means and said inner piston part in its telescoped position within said outer piston part whereby said outer piston part is retained in its extended brake applying piston.

2. A brake actuator as claimed in claim 1, wherein said lock means includes clutch means for controlling operation of said strut means and auxiliary fluid pressure actuated motor means controlling operation of said clutch means, said motor means comprising an open ended auxiliary cylinder and a motor piston extending through an open end of said cylinder, said motor piston having one end exposed to pressure in said auxiliary cylinder and an opposite end exposed to pressure in said pressure space.

3. A brake actuator as claimed in claim 1, wherein said strut means includes a screw threaded shaft threadedly engaged in said inner piston part with limited axial play between said shaft and inner piston part; and said lock means includes spring biassed clutch means normally preventing rotation of said shaft relative to said inner piston part and wherein when said normal braking pressure displaces said brake applying piston in excess of said axial play said clutch means is released to enable said shaft to rotate and thereby increase its effective length, whereby to effect automatic adjustment for brake lining wear.

4. A brake actuator according to claim 3, wherein said clutch means includes a friction clutch head engageable with a non-rotary clutch face, said clutch head being spring biassed into engagement with said clutch face in a direction opposite to the brake-applying direction of movement of the brake applying piston.

5. A brake actuator for a fluid pressure actuated vehicle disc brake comprising a brake reaction structure defining a cylinder bore, a brake pad applying piston in said cylinder bore, said piston comprising an annular outer piston part slidingly sealed in said bore and an inner piston telescopically sealed in said outer piston part; pre-stressed resilient means located in said piston and acting between said piston parts to resist telescoping thereof under braking and reaction load pressures; means defining an axial screw threaded bore in said inner piston part; a lock actuator strut having a screw-threaded shaft threadedly engaged in said screw threaded bore and a clutch head remote from said inner piston part; a fixed clutch face associated with said reaction structure; clutch spring means biasing said clutch head into frictional clutching engagement with said clutch face; an auxiliary motor cylinder bore formed in said reaction structure and aligned axially with said strut, a motor piston in said auxiliary motor cylinder bore and having an outer end engageable with said strut, and means for supplying fluid pressure to said motor cylinder to urge said piston into engagement with said strut in a sense to break clutching engagement between said head and said clutch face.

* * * * *